(12) United States Patent
Quinn (10) Patent No.: US 7,444,958 B2
(45) Date of Patent: Nov. 4, 2008

(54) PET BED WITH ELEVATED DISHES, CUSHIONS WITH ADJUSTABLE SUPPORT, TIE DOWN POST, MESH BAG, AND AROMATHERAPY CAPACITIES

(76) Inventor: Christie Lynn Quinn, 2717 Tonto Way, San Diego, CA (US) 92117

( * ) Notice: Subject to any disclaimer, the term of this patent is extended or adjusted under 35 U.S.C. 154(b) by 320 days.

(21) Appl. No.: 11/242,107

(22) Filed: Oct. 3, 2005

(65) Prior Publication Data

US 2007/0074667 A1  Apr. 5, 2007

(51) Int. Cl.
*A01K 29/00* (2006.01)
(52) U.S. Cl. .......................................... 119/28.5; 5/641
(58) Field of Classification Search ................ 119/28.5, 119/475, 482, 61.5, 61.55, 61.56, 61.57; D30/118; 5/641, 948
See application file for complete search history.

(56) References Cited

U.S. PATENT DOCUMENTS

| | | | | |
|---|---|---|---|---|
| 2,032,248 | A | * | 2/1936 | Bins ............................ 119/482 |
| 2,659,345 | A | * | 11/1953 | Herbert ....................... 119/28.5 |
| 3,989,008 | A | * | 11/1976 | Neumann .................... 119/28.5 |
| 4,008,688 | A | | 2/1977 | Nicholas |
| 4,064,835 | A | * | 12/1977 | Rabenbauer ................ 119/28.5 |
| 4,539,935 | A | * | 9/1985 | Meyer ........................ 119/28.5 |
| 4,961,930 | A | * | 10/1990 | Perdelwitz et al. ........... 424/411 |
| 5,000,116 | A | * | 3/1991 | Fife et al. .................... 119/28.5 |
| 5,106,622 | A | * | 4/1992 | Sherwood et al. ........... 424/770 |
| 5,136,981 | A | | 8/1992 | Barreto |
| 5,220,884 | A | * | 6/1993 | Townsend ................... 119/496 |
| 5,226,384 | A | | 7/1993 | Jordan |
| 5,311,837 | A | * | 5/1994 | Mamer-Boellstorff ..... 119/28.5 |
| 5,320,066 | A | | 6/1994 | Gunter |
| 5,662,065 | A | * | 9/1997 | Bandimere et al. ......... 119/28.5 |
| 5,685,257 | A | | 11/1997 | Feibus |
| 5,706,535 | A | * | 1/1998 | Takashima ...................... 5/485 |
| 5,724,911 | A | * | 3/1998 | McAlister ................... 119/28.5 |
| 5,732,426 | A | * | 3/1998 | Furuya et al. .................... 5/636 |
| 5,776,477 | A | * | 7/1998 | Ryder .......................... 424/405 |
| 5,784,995 | A | * | 7/1998 | Willinger .................... 119/28.5 |
| 5,819,347 | A | * | 10/1998 | Masuda .......................... 5/641 |
| 6,173,675 | B1 | | 1/2001 | Liccardo |
| 6,430,764 | B1 | * | 8/2002 | Peters ............................. 5/641 |
| 6,508,200 | B1 | * | 1/2003 | Remis ........................ 119/28.5 |
| 6,553,935 | B1 | * | 4/2003 | Penner ....................... 119/28.5 |
| 6,698,380 | B2 | | 3/2004 | Morrison |
| 6,760,937 | B1 | * | 7/2004 | Ou .............................. 5/652.1 |
| 7,237,506 | B2 | * | 7/2007 | Dietz ......................... 119/28.5 |
| 2004/0163603 | A1 | | 8/2004 | Newton |

* cited by examiner

*Primary Examiner*—Yvonne R. Abbott
(74) *Attorney, Agent, or Firm*—Eric Hanscom; Todd Langford

(57) ABSTRACT

This invention is directed toward a multitasking pet bed with numerous features, including a shell, which can be optionally, a two-part bed easily broken down for transportation, with, in various combinations, one or more foam pads attached to the bottom of the bed (and to each other), which can be stacked to provide harder or softer beds, where the foam pads can be, optionally, covered with or without a waterproof liner, and foam, liner, and cover can be washed, together or separately, and dried by household washers and dryers, elevated cavities for two dishes, a bath collar tie down, a holder for a mesh bag, a mesh bag, holders for aromatherapy inserts, and, optionally, removable and exchangeable aromatherapy sachets with cedar chips doused with one or more oils enclosed in a cloth bag, where the aromatherapy is done 100% naturally, without any pesticides, insecticides, or other chemicals.

20 Claims, 3 Drawing Sheets

PET BED WITH ELEVATED DISHES, CUSHIONS WITH ADJUSTABLE SUPPORT, TIE DOWN POST, MESH BAG, AND AROMATHERAPY CAPACITIES

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

This invention is directed toward a multitasking pet bed with numerous features, including a shell, which can be optionally, a two-part bed easily broken down for transportation, with, in various combinations, one or more foam pads attached to the bottom of the bed (and to each other), which can be stacked to provide harder or softer beds, where the foam pads can be, optionally, covered with or without a waterproof liner, and foam, liner, and cover can be washed, together or separately, and dried by household washers and dryers, elevated cavities for two dishes, a bath collar tie down, a holder for a mesh bag, a mesh bag, holders for aromatherapy inserts, and, optionally, removable and exchangeable aromatherapy sachets with cedar chips doused with one or more oils enclosed in a cloth bag, where the aromatherapy is done 100% naturally, without any pesticides, insecticides, or other chemicals.

The human race has domesticated animals for tens of thousands of years. While it is unclear when exactly humans stopped using animals solely for food and guard animals, and began using them for pets, it is estimated that this occurred sometime between 15,000 to 12,000 B.C. Sometime during the process of using animals for pets, humans began making beds for their pets, so that the pets did not have to sleep on the hard, and sometimes cold, ground. Starting in the 1960's, commercially manufactured pet beds became available and today are a major industry.

The two most popular models of pet beds are the flat, mattress-type pet beds, which consist of a round, oval, rectangular, or square pad, made from a variety of materials, usually 6" to 12" in depth, covered by a cover, which is usually removable for machine washing. The second type of pet bed, upon which this invention improves, consists of a flat pad surrounded on two or more sides by a bolster. The bolster is usually made from the same blown foam from which the pad is constructed, and is glued around its edges to the pad.

Over the bolstered pad most commercial manufacturers usually have a removable pad which is designed to keep pet fur, smells, and liquid from permeating and ruining the foam pad and bolster. The main problem with this type of pet bed arises when a user attempts to remove the cover for cleaning and then put it back on. Because there is only glue holding together the two pieces of blown foam, any substantial tugging or pulling to remove the foam and bolster from the cover frequently results in a tearing of the blown foam, usually at the seam between the pad and the bolster.

The user frequently encounters other problems when he/she tries to re-insert the pad and bolsters into the newly washed and dried mattress cover. Even if the cover is form fitted to the pad and bolster, it is often quite difficult to slide the pad and bolster into the cover, as the blown foam will catch on the inside of the cover and tears. Once the user manages to cram the foam pad and bolster inside the cover, because of the tendency of the foam to catch on the inside of the cover the user frequently has to drastically compress the foam to cram it inside of the cover. Once the foam has been stuffed into the cover, it usually uncompresses in a form that does not fit the cover, requiring further compression/movement of the foam or attempted shifting of the cover. These actions usually result in further tearing of the foam and a permanent lack of fit between the foam pad and bolster and the cover. Thus, many pet owners, having attempted unsuccessfully to clean the cover and reassemble the foam and cover resort to treating pet beds as disposable items, merely throw away the old bed after several months of soiling, and replace it with a new one, rather than hassle with trying to replace the pad and bolsters inside a cleaned cover.

The prior art has several examples of attempts to resolve these problems. U.S. Pat. No. 5,226,384 to Jordan and U.S. Pat. No. 5,685,257 to Feibus both teach multi-layer pet beds utilizing a wide variety of types of cloth and various materials to provide protection from liquids, insects, fur, and other undesirable elements while at the same time providing a flat, soft, and presumably comfortable bed for the pet. These devices do not, however, provide for bolsters or a way to effectively remove and replace the mattress pad from other than a purely six-sided, simple, structure. U.S. Pat. No. 5,136,981 to Barreto describes the use of sidewalls, but does not propose a method of combing a foam cushion with a hard surrounding structure which provides the support for the pet's back when he or she uses the bed. U.S. patent application Ser. No. 2004/0,163,603 A1 to Newton deals with a fitted sheet which covers a flat grooming table or flat pet bed mattress. While this invention does teach the use of a fitted sheet, it does not discuss any applicability to a more complex and effective structure, such as Quinn's invention, which teaches a plastic or fiberglass pet bed shell with a cavity into which can be fitted one or more foam cushions. The advantages of the current invention include the facts that the back support for the pet does not come from the cushion sides themselves, and that the cushion can be washed and returned to its functional position without the necessity of inserting it into an unwieldy cover.

Aromatherapy is the science of using smells to promote various moods and enhance healing processes. Basically, aromatherapy uses one or more oils in various formulations to either treat a particular problem or as part of a daily regimen designed to improve the overall health of the subject. Essential oils can be used in three different ways: applied topically, diffused and inhaled, and taken internally. Aromatherapy deals with the effects of oils which are diffused and inhaled.

The oils are derived from plants, which have evolved over many generations with oils as integral parts of their physical and chemical makeup. In nature these oils can serve a variety of functions in the plants, such as insect repellents and fighting off bacteria and viruses.

These oils also have effects on human and animals as well. Since each oil derived from a plant can have a vast spectrum of effects on the subject, a variety of oils can be combined to achieve synergistic effects. Such uses include antibacterial, antifungal, relaxation, anti-inflammatory, anitpruritic, sedative, stimulation, and regeneration functions.

While there is a plethora of studies on the effects of aromatherapy on humans, very little has been done using aromatherapy for pets. This area is one in which further exploration would be useful, as the sense of smell in many species of animals is much more pronounced than in humans. Dogs in particular make ideal subjects for aromatherapy due to their acute sense of smell, their ready willingness to sniff out new smells, and the unique structure of their nasal cavities which allows them to quickly absorb the aromas emanated through aromatherapy.

There exists in the prior art patents which combine pet beds with various substances designed to improve the health of the pet. Such inventions include mattresses with cedar shavings and a cover (U.S. Pat. No. 5,320,066 to Gunter), a pet bed with insecticidal properties (U.S. Pat. No. 4,008,688 to Nicholas), a pet mattress for aromatherapy herbs embedded in the mattress (U.S. Pat. No. 6,173,675 to Licciardo), and a pet bed containing cottonseeds into which a fragrance and/or pesticide can be added (U.S. Pat. No. 6,698,380 to Morrison). None of these inventions, however, lend themselves to easy washing of the bedding material, or allow a user to easily, quickly and conveniently replace one aromatherapy regimen with another. Finally, none of these inventions provide a method by which the pet can be washed, dried, or groomed while standing on the bed itself as does the current invention.

Another issue dealt with my most pet owners is how to wash their pet. While a variety of commercial pet washing business have sprung up over the past decade, a large number of pet owners continue to wash their pets by hand. While pet owners with backyards and driveways can wash their pets outside, apartment and condominium owners often do not have that luxury. A pet owner having to wash his or her pet indoors usually gets to choose from washing the pet in the bathtub (and dealing sanitation issues along with fur clogging the drain), or washing the pet on the floor (and, for apartment dwellers, dealing with losing their security deposit or even facing eviction for wrecking the floor). Thus, there exists a need for a device which allows a pet owner to wash the pet outside of the bathtub and contain the water and soap subs.

The current invention responds to this need by providing a waterproof pet bed shell to which a pet can be tethered for washing. Thus, an owner living in an apartment, condominium, or other location which does not have a backyard, can wash the pet over the shell and then either dump out the water without getting it on the floor by carrying the shell to a nearby sink. Even with a larger dog, where the volume of water needed to successfully wash the dog would be prohibitively heavy to carry to a sink, the owner can scoop water out of the shell with a pitcher or improvised scoop made of a gallon milk or water jug with the upper section cut off, thereby allowing the owner to empty the pet bed shell in small increments. For an owner with a backyard, the invention allows the owner to tether the pet to the shell such that the pet cannot run away while being washed.

Another area related to pet health which has not been utilized significantly in the area of pet health is the level of a food dish with respect to the animal. Studies show that a pet whose food dish is on the ground undergoes greater stress on its body than a pet whose food dish is elevated, even when the elevation is only slight. This appears obvious—humans have been eating off tables and sitting in chairs for eons, so why not apply the same orthopedic principles to animals—and yet the vast majority of pet bowls are free standing structures designed to lay flat at ground level. Elevated food and water bowls have also been shown to put less digestive stress on pets.

Pet owners who wish to travel with their pets are often faced with the difficult task of hauling along a frequently unwieldy large pet bed along with other items such as food and water dishes, pet washing items, etc. Thus, there is a need for a pet bed device which not only combines a number of traditionally separate features, but also breaks down into an easily transported size.

A final unaddressed need in the pet bed industry is a means by which a pet's toys, food, medications, or other items could be attached to and kept with the pet bed. It is desirable for a pet owner to keep the pet's "accessories" near the pet by a means which allows the pet owner to find them easily. When the pet is being transported, it is also desirable to keep the pet's accessories attached to the pet bed such that nothing gets lost during the drive or flight.

While there have been a number of inventions in the past relating to some combination of aromatherapy, orthopedically healthful and digestively-beneficial food dishes, and pet washing devices, there exists a long-felt need for a pet bed with an easily removable, washable and stackable cushion device, elevated water and food dishes, pet washing capabilities, means of keeping the pet's accessories in a known and easily remembered location, along with a means of using aromatherapy with the pet.

The current invention meets these needs with a single invention which address all of the above concerns, namely a multitasking pet bed with numerous features, including a shell, which can be optionally, a two-part bed easily broken down for transportation, with, in various combinations, one or more foam pads attached to the bottom of the bed (and to each other), which can be stacked to provide harder or softer beds, where the foam pads can be, optionally, covered with or without a waterproof liner, and foam, liner, and cover can be washed, together or separately, and dried by household washers and dryers, elevated cavities for two dishes, a bath collar tie down, a holder for a mesh bag, a mesh bag, holders for aromatherapy inserts, and, optionally, removable and exchangeable aromatherapy sachets with cedar chips doused with one or more oils enclosed in a cloth bag, where the aromatherapy is done 100% naturally, without any pesticides, insecticides, or other chemicals.

SUMMARY OF THE INVENTION

It is a principal object of the invention to provide a pet bed which combines a two-part bed, easily broken down for transportation, with, in various combinations, one or more foam pads attached to the bottom of the bed (and to each other), which can be stacked to provide harder or softer beds, where the foam pads can be, optionally, covered, and foam and cover can be washed, together or separately, and dried by household washers and dryers, elevated cavities for two dishes (for food and water) and two dishes, where the dishes are retained in the dish cavities by means of attachment, a bath collar tie down, a holder for a net bag, a net bag, cavities for aromatherapy oils, and cavities for easily removable and exchangeable aromatherapy sachets.

Another object of the invention is to have a two-piece bed, manufactured of plastic, fiberglass, or a similar lightweight yet strong material which is waterproof.

A further object of the invention is that the pet bed is put together with bolts and butterfly nuts such that if can be broken down quickly and easily.

It is an additional object of the invention that a user be able to wash his or her pet in the bed to prevent the water and soap from getting on the floor.

Further objects of the invention include the ability of a user to tether the pet to the shell such that the pet cannot run away while being washed, or from rolling in nearby dirt or other undesirable locations after being washed.

It is another principal object of the invention to allow a user to exchangeably insert and remove various aromatherapy scents, in combination or alone, to respond to various ailments or conditions of the pet, or as a strengthening regime designed to fend off illnesses or strengthen various internal systems of the pet.

It is another object of the invention that the aromatherapy scents be used in both oil or oil combination forms, or in the form of dried parts of plants contained the essential oils, in the forms of sachets.

Additional objects of this invention include using cedar chips as the base material on the sachets onto which the oils are poured, where the cedar chips have the properties in addition to absorbing and releasing over time the oils of repelling fleas and promoting a healthy coat.

Further objects of the invention include the ability of the user to easily remove and exchange the oils or sachets.

It is also an object of the invention that the sachets can be made of cloth or nylon, or another material which serves functions of both retaining the cedar chips and allowing the scents from the cedar chips to emanate through the bag's material.

A further object of the invention is that the bag has a means of opening and closing, such as zippers, snaps, hook and look, or drawstring.

An additional object of the invention is that the sachet can be made in the form of a bag, a pillow, or even a doughnut which is laid around the outside of the pet bed cushion.

It is an additional object of the invention that the shell of the bed be made of two pieces such that it can be broken down into two, nesting portions such that the invention can be easily transported.

It is a further object of the invention that the pet bed contains cavities for two dishes—one for food and the other for water—where the dishes are removably attached to the bottom of the cavity by hook and loop, snaps, or another means of attachment.

It is also an object of this invention that the dishes are elevated to promote easy digestion by the pet.

Additionally, the invention is designed to have a collar tie-down, such that a pet owner can wash the pet in the bed without spilling water and soap suds on the floor.

It is another object of the invention that the pet bed shell be waterproof such that after washing and drying the pet while the pet is tied down to the pet bed, the owner can let the pet loose and carry the pet bed with its water and soap suds to a sink where it can dump the dirty water down the sink drain.

It is an additional object of the invention that the pet bed has a clip device to which a mesh bag can be attached, where the mesh bag can contain the food, medications, brushes, pet leash, toys, or other items that the pet needs.

It is a further object of the invention that the pet bed has one or more foam cushions, which can be stacked on top of each other or removed to make the pet bed harder or softer depending on the desires of the pet owner (and pet).

It is also an object of this invention that each foam pad has a means of attachment on it, such as snaps or hook and loop fasteners, which allow the pet owner to removably stack foam pads and retain them to each other and the bottom of the pet bed.

Additionally, the foam pads are optionally manufactured of a material which is machine washable, such that the pet owner can sanitize the foam pads by merely throwing them into the washing machine.

Another object of the invention is that the foam pads can be covered with a waterproof liner which will prevent wetness form the animal to seep into the foam pad.

It is also an object of the invention that the cushions have optional covers.

A further object of the invention has an optional waterproof liner between the cover and the foam pad, such that the foam pad and cover can be removed for cleaning.

It is another object of the invention that the cushion covers have means of attachment on it, such as snaps or hook and loop fasteners, which allow the pet owner to removably stack foam pads via the means of attachment on the covers and retain them to each other and the bottom of the pet bed.

It is a further object of the invention that the cover be manufactured in both machine washable and disposable versions.

Further objects of the invention also include the production of the pet bed shell in a number of different sizes, such that a pet bed of the appropriate size can be manufactured for pets ranging from kittens to large dogs.

It is an additional object of the invention that where the foam pads have covers, the foam pads and covers can be washed and dried together or separately.

A further object of the invention is that the user of the invention does not need to remove the cushions for washing, but rather can put the pet bed with cushions attached outside and hose it down with a garden hose.

It is a final object of this invention that the invention be manufactured for only slightly more than the currently available models, thereby making this invention commercially attractive.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE INVENTION AND FIGURES

Figure 1:
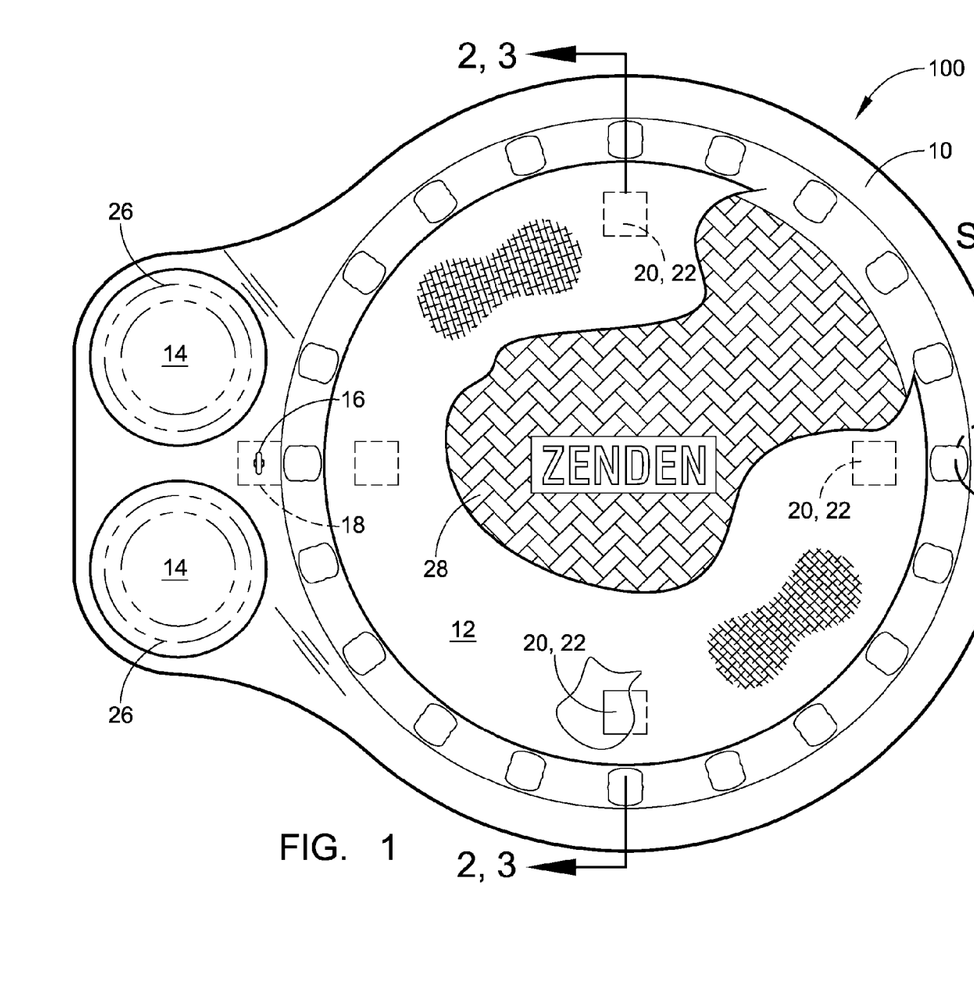
FIG. 1 is a top view with a partial cut-away showing the basic components of my invention.
Figure 3:
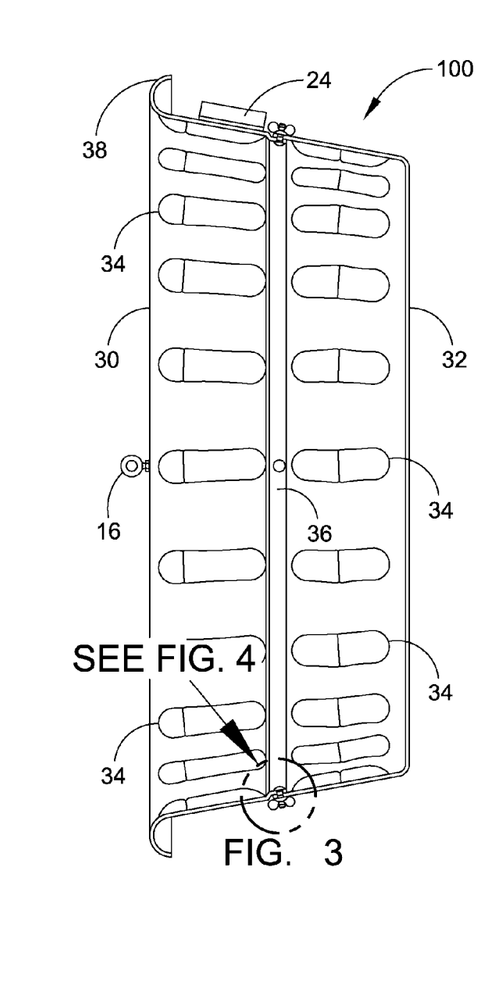
FIG. 3 is a side, cut-away view of my invention showing some of the basic structural components.

FIG. 1 is a top view with a partial cut-away showing the basic components of the invention. The invention, generally referred to by (100), has a pet bed shell (10), which comes in two pieces, as illustrated in FIG. 3, and can be made of plastic, fiberglass, or lightweight metal. The shell (10) is generally circular, with a bottom portion resting upon the ground and supported on its edges by roughly circular shell wall portions, which are, in turn, held in place by shell sides, with an elongated end with two elevated bowl cavities (14), into which two bowls (26) can be inserted: one for food; the other for water.

These bowls are removable, and can be temporarily secured by hook and loop, snaps, or other removable means of attachment. The bowl cavities (14) are elevated to promote easier digestion and less stress on the joints and musculature of the pet. Near the bowl cavities (14) is a leash tie down post (16) to which a pet's leash can be tied when the owner wishes to wash, dry, or groom the pet while the pet is kept above the shell (10), thereby preventing any water or soap suds from the pet from falling on an underlying floor. This is a particular advantage of this invention for pet owners who live in apartments, condominiums, areas with uncomfortably cold or even dangerously cold winters, or other places where the pet owner cannot easily take the pet outside for a bath.

The tie down post (16) also facilitates the washing of a pet that does not enjoy baths, and will prevent the pet from running away and hiding from the owner when a bath is imminent. It will also allow a dog owner in an apartment or condominium to wash a pet over a floor, then dry the groom the pet without getting an excess of water on the floor, as the water and suds will be contained in the bed shell. The user can then physically pick up the shell and dump the water down the drain, or, in case of larger pets with larger beds, empty the water and suds with a scoop until the shell is light enough to carry. The tie down post (16) is kept from pulling through the shell (10) by a flat washer (18) with a much larger surface area than the threaded nut which is screwed onto the end of the bolt coming off the tie down post.

It is envisioned that the shell can be made in a wide variety of different sizes and with a variety of different side heights, such that the invention can be manufactured in a wide range of sizes and shapes to accommodate pets ranging from small kittens to large dogs. With the smaller versions of the invention, it is anticipated that a pet owner can place the shell on a table or counter, and then wash, dry and groom the pet at an elevated location which is easier on the pet owner's back than would be the traditional method of washing a pet in the bathtub or shower.

At the end of the shell (10) opposite the bowl cavities (14) is an aromatherapy container (not shown in this figure) and a means for attaching a mesh bag (20, 22). The aromatherapy container contains the exchangeable aromatherapy inserts, discussed later. It is also envisioned that the device can contain more than one aromatherapy container. The mesh bag (not shown in this figure) can be used to store a pet's toys, medicines, leash, food, and other accessories.

There can also be, optionally, rubber feet attached at varying intervals around the edge of the shell which will prevent the shell from sliding around on rough surfaces (not shown in this figure).

The edges of the shell (10) are raised relative to, and define a cavity in, the center of the shell (10). The bottom of the central portion of the shell (28) has an attractive, aesthetically pleasing, traction-providing texture, such as a cross-hatch or woven pattern, as illustrated here, or another pattern which will allow a pet being bathed or groomed to maintain some traction on the bottom of the shell, thereby making the pet more comfortable with the bathing, drying, or grooming process and assisting the pet with remaining in a standing position rather than falling over. The bottom of the shell is waterproof, made out of the same waterproof material that makes up the rest of the shell, such that a pet owner can wash a pet in the shell, or keep liquids from the dog from soaking into a car seat, such as could happen when a dog owner is returning from the beach.

The bottom of the shell is normally covered with one or more cushions (12), which may be removable and stackable, but which can be removed when a pet user wants to use the invention as a pet bathing area. The cushion (12), which, in this iteration of the invention is shown as a single cushion, is removably attached to the bottom (28) by hook and loop, snaps, or other means of removable attachment. It is contemplated that a plurality of cushions can be stacked on top of one another, and removably connected to one another by hook and loop, snaps, or similar easily detachable means of attachment, such that the pet owner can provide a softer or harder cushion for the pet depending on the pet's needs. It is further envisioned that a cushion could be manufactured with raised sides, in a doughnut shape, to give a pet back and side support, and that these doughnut-shaped cushions are optimally located on top of a stack of cushions such that the pet has soft padding under its body and around its back and side. The bottom (28) also provides a number of locations at which a mesh bag (not shown in this figure) can be attached (20, 22).

Figure 2:
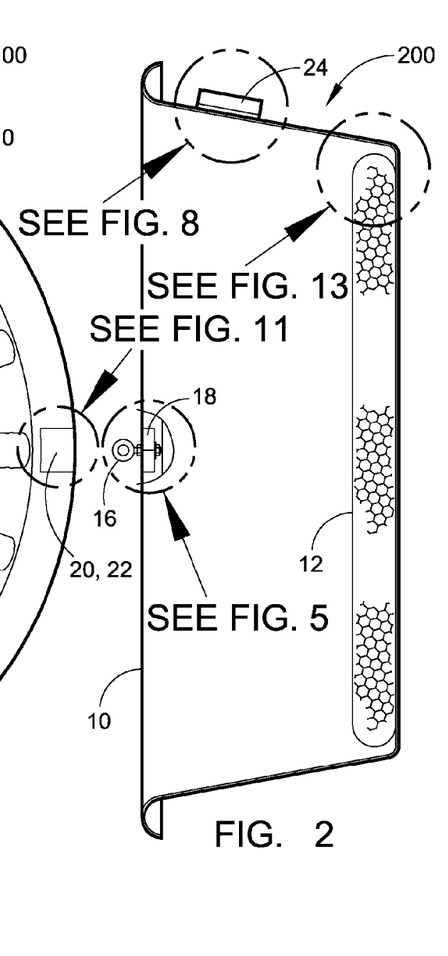
FIG. 2 is a side, cut-away view of my invention showing some of the basic internal components.

FIG. 2 is a side, cut-away view of my invention showing some of the basic internal components. The invention, generally indicated by reference number (200) shows an iteration of the invention where the shell (10) is composed of a single piece of plastic, fiberglass, or lightweight metal. Along the side of the shell is an aromatherapy container (24), of which it is contemplated that there could be one or a plurality of aromatherapy containers. The aromatherapy container (24) could either be built into the shell, or attached to the shell such that it could be easily removed for cleaning. Cleaning could be important as a means of removing any scent from the last aromatherapy treatment before embarking on a new one.

Along the bottom of the shell lies a cushion (12), which has a foam structure inside which allows the cushion to be lightweight and, at the same time, to provide comfortable support to the pet. It is envisioned that there could be several versions of the cushion: where the cushion has no cover; where the cushion has a non-waterproof cover; where the cushion has a non-waterproof cover and a waterproof liner; and where the cushion has a waterproof cover. In terms of bathing the pet, it is envisioned that the pet owner can either remove the cushion(s) and bath the pet with the pet standing on the bottom of the shell, or leave the cushion(s) in the shell and bath the pet while the pet is standing on the cushion(s). With respect to washing the cushion(s), the invention contemplates a number of different scenarios: where the user keeps the cushion in the shell and washes it with a hose or similar water blasting means, then leans the shell up against a nearby wall to drip dry; where the user removes the foam cushion without a cover and washes it by hand or in a washing machine, then dries it in a dryer; where the user removes a cover from the cushion and washes, dries, then replaces the cover on the cushion; where the user washes both the cushion and cover together, then dries them as one unit; where the user removes a cover and washes it, and, optionally, also washes a waterproof liner and the foam cushion itself; and, where the cushion is disposable, whereby a user can use a cushion, cushion with cover, or cushion with cover and waterproof liner for a period of time after which he/she throws it away and uses a new one.

This figure also shows a side view of the tie down post (16) with the flat washer (18) used to keep it from pulling through the shell (10).

FIG. 3 is a side, cut-away view of my invention, referred to generally by (100) showing some of the basic structural components. This iteration of the invention has a two-part shell, with an upper section (30) and a lower section (32), which meet at an attachment line (36). Both sections have stabilizing ridges (34) which are structural supports built into the sides of the shell, which help to maintain the structural integrity of the unit. Also visible in this figure are the tie down post (16) and the aromatherapy container (24).

Figure 4:
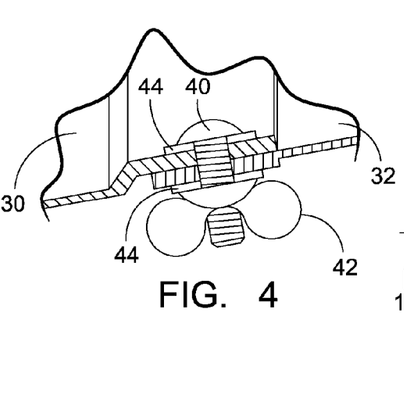
FIG. 4 is side, cut-away view of my invention showing the means of attachment between the two halves of the pet bed frame.

FIG. 4 is side, cut-away view of my invention showing the means of attachment between the two halves of the pet bed frame. The upper section (30) and lower section (32) overlap each other and have several aligned holes through both sections which allow a user to assemble and break down the shell into its two halves quickly and easily. A bolt (40), buttressed by a flat washer (44) extends through both sections, and is secured in place by a wing nut (42), which also has a flat washer (44) between it and the side of the sections. The result of this means of attachment is that the wing nut can be tightened down on the bolt without gouging or otherwise injuring the sides of the shell, and the flat washers (44) also increase the surface area over which the pressure is spread, thereby decreasing the chances that the bolt head or wing nut will be pulled through the sections by over tightening or stress during moving, use, assembly, or breakdown.

Figure 5:
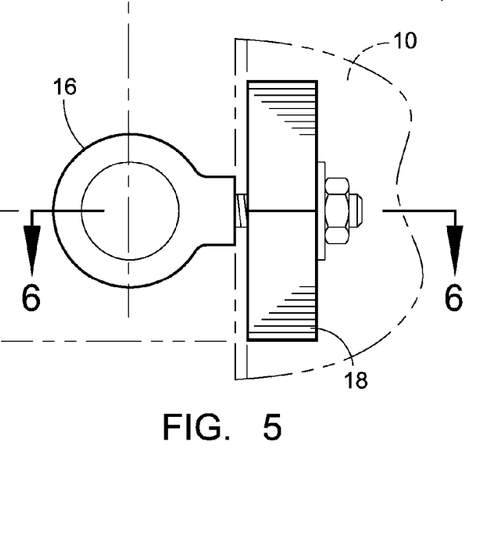
FIG. 5 is side view of the pet leash tie down device which can be used to keep a pet situated over the pet bed shell for washing, drying, and grooming.

FIG. 5 is a side view of the pet leash tie down device which can be used to keep a pet situated over the pet bed shell (10) for washing, drying, and grooming. The tie down post (16) lies above the shell, while the flat washer (18) that secures it against being pulled through the shell lies just beneath the surface of the shell. The eyelet of the tie down post (16) makes it easy for a pet owner (or pet washer) to secure the pet to the shell for easy washing, drying, and grooming.

Figure 6:
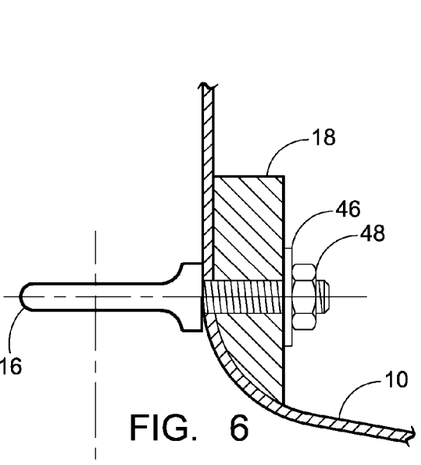
FIG. 6 is a cross section of the pet leash tie down device illustrated in FIG. 5.

FIG. 6 is a cross section of the pet leash tie down device illustrated in FIG. 5. The tie down post (16) extends out of the shell (10), where a user can easily thread a pet's leash through the eyelet to secure the pet during washing, drying, or grooming. Prevented the tie down post (16) from being pulled through the shell (10) by a pet not desiring a bath or other treatment is a flat washer (18), which is held in place by a nut (48), which is tightened down against a small washer (46). Considering that a large dog, particularly one who does not like baths, can exert a considerable pull against the tie down post (16), it is useful that the tie down post have the anchoring mechanism in place on the other side of the shell (10).

Figure 7:
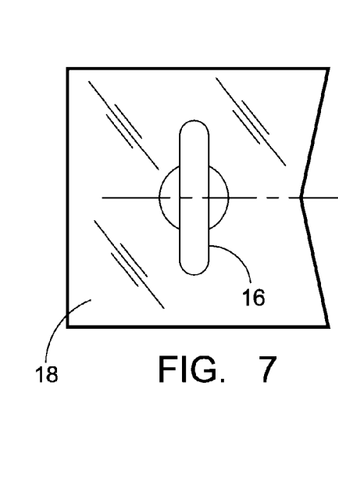
FIG. 7 is a top view of the pet leash tie down device illustrated in FIG. 5.

FIG. 7 is a top view of the pet leash tie down device illustrated in FIG. 5. The tie down post (16) lies above the shell, while the flat washer (18) that secures it against being pulled through the shell lies just beneath the surface of the shell.

Figures 8, 9, 9A, 10, 11, 12, 13:
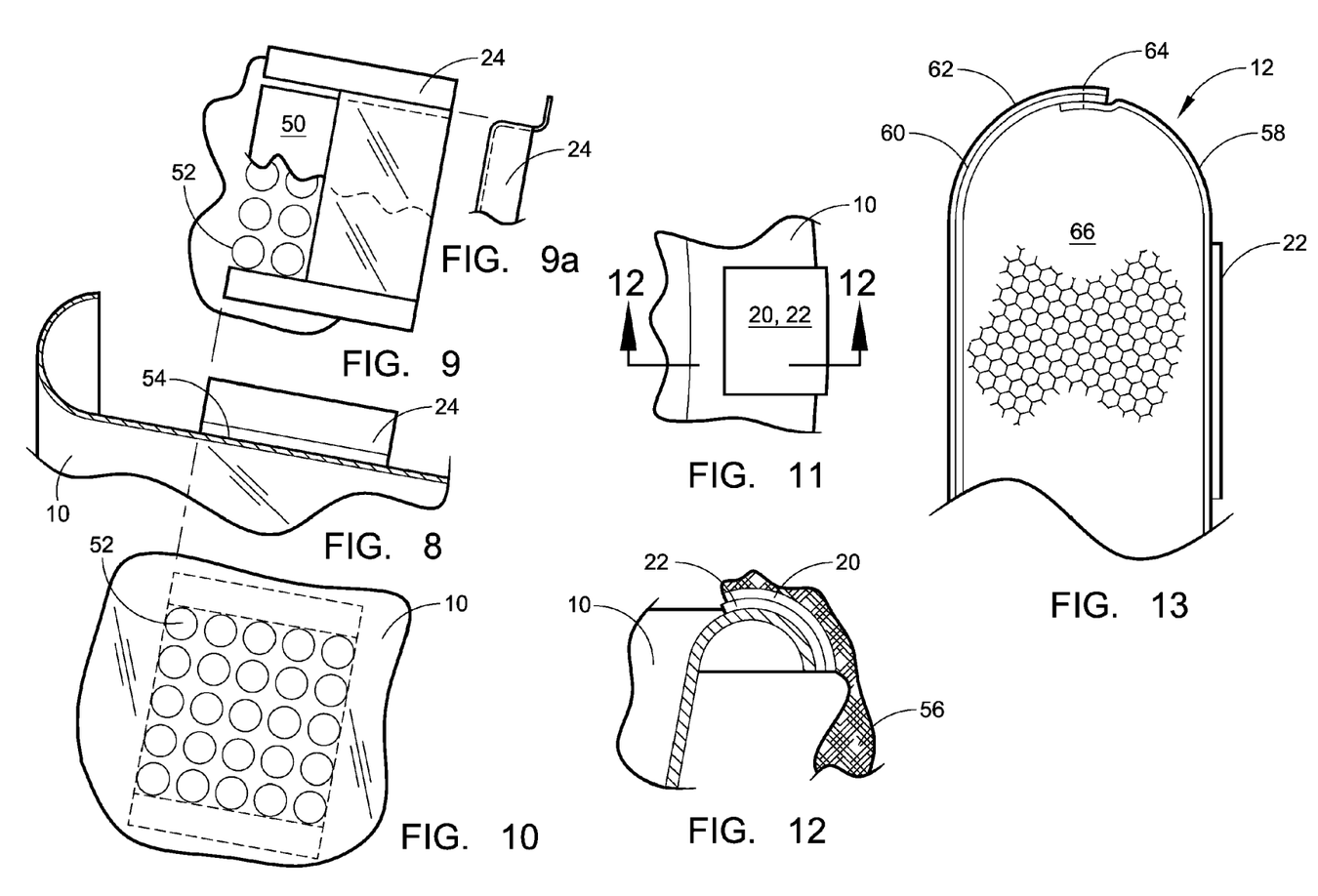
FIG. 8 is a cross section view of the upper edge of the pet bed shell with the aromatherapy holder device illustrated.
FIG. 9 is a top, partial cut-away view of the aromatherapy holder device.
FIG. 9a is a side view of the aromatherapy device as it is situated with respect to the side of the pet bed shell.
FIG. 10 is a bottom, put-away view of the aromatherapy holder device.
FIG. 11 is a top view of the attachment point for the mesh storage bag.
FIG. 12 is a side, cut-away view of the mesh storage bag and its means of attachment.
FIG. 13 is a side, cut-away view of the cushion.

FIG. 8 is a cross section view of the upper edge of the pet bed shell (10) with the aromatherapy holder device illustrated. The aromatherapy container (24) sits upon the shell (10), a portion of which (54) located directly under the aromatherapy container (24) is perforated with holes to allow the essential oils and other aerosol components of the aromatherapy substances to diffuse through the shell (10) and into the inner portion of the pet bed where it can have its positive effects on the pet.

FIG. 9 is a top, partial cut-away view of the aromatherapy holder device. The aromatherapy container (24) has an outer surface (50) which is solid, and an inner surface (52) which has holes in it. It is contemplated that another version of the invention could provide a shell with the section which in this figure is full of holes a cut-out section, into which could fit a small panel which has many holes in it, such that the insert could be easily removed for cleaning.

FIG. 9a is a side view of the aromatherapy device as it is situated with respect to the side of the pet bed shell. The aromatherapy container (24) is basically a sleeve into which a variety of aromatherapy inserts can be placed and removed by the pet owner depending on the effect desired for the pet. While it is also conceived as part of this invention that the principles of aromatherapy can be used effectively by dousing cedar chips on a bag with one or more essential oils, FIG. 9a deals only with the aromatherapy inserts.

It is contemplated that aromatherapy can be used to benefit the pet in two basic ways. First, aromatherapy inserts can be placed into the aromatherapy container as illustrated in this and other figures. The aromatherapy inserts comprise the porous material, such as cotton or a cedar chip, into which one or more aromatherapy oils can be applied, with a pull tab or other means of inserting the aromatherapy insert and removing it when it is either used up or when the user wants to switch aromas to a new treatment plan or scent. Second, aromatherapy sachets can be construction of cedar chips upon which one or more essential oils are poured, thereby creating the aromatherapy sachet which can be left in the pet bed, made into a cushion, or inserted into the mesh bag. In terms of the sachets, it is contemplated that different versions of the invention can have sachets with cedar chips of different scents, where the bags and the cedar chips are washable such that a user can remove an old aromatherapy scent and replace it with a new one, and iterations where the sachets are removably attached to the cushions with hook and look, snaps, or other means of easily removable attachment.

The invention teaches two distinct aromatherapy blends of oils. The first blend is useful for skin conditioning and relaxation, and includes lavender, Roman chamomile, carrot seed and marjoram. Lavender has anti-bacterial and anti-itching properties, and also calms and soothes anxious dogs. Roman chamomile has an intensely calming, soothing effect on the central nervous system, thereby relaxing tense joints and muscles. Carrot seed is excellent in treating dry, flaky, itchy skin, as well as having healing properties and promotes skin rejuvenation while stimulating tissue regeneration. It also has anti-inflammatory and anti-bacterial properties to promote a healthy coat. Marjoram also promotes calmness and is used for wound care and insect repellant.

The second blend is an immune booster which promotes balance and wellness through tonifying the system. The main ingredients for this blend are eucalyptus, ravensare, coriander, and thyme thujarol. Coriander stimulates the circulatory system, thereby promoting circulation in the joints and muscles, which, in turn, helps to relieve pain from arthritis and muscle aches. Eucalyptus serves as a natural flea repellant and has anti-viral and anti-inflammatory properties to support the immune system. Ravensare promotes a healthy and strong immune system and has tonifying properties. Thyme thujarol stimulates the immune system, detoxifies, tonifies, and strengthens the liver, along with having anti-viral properties and serving as a tick repellant.

FIG. 10 is a bottom, cut-away view of the aromatherapy holder device. Embedded in the shell (10) are a series of small holes (52) through which the aromatherapy scents diffuse from the aromatherapy inserts into the inside of the shell (10) where they can have the desired effect on the pet.

FIG. 11 is a top view of the attachment point for the mesh storage bag. Attached to the shell (10) is a means of attachment for a mesh storage bag (20, 22). This point of attachment is located at the far side of the shell away from the bowl cavities, and uses the same means of removable attachment as is used for removably attaching the cushion to the bottom of the shell, as illustrated in FIG. 1.

FIG. 12 is a side, cut-away view of the mesh storage bag and its means of attachment. Against the bottom of the shell (10), at the outer circumference of the curve from the bottom of the shell to the side of the shell, are two parts (20, 22) of a means of attachment. The most common means of attachment is hook and loop, where (20) could be hook and (22) could be loop, but male and female snap members are also contemplated. Attached to the outer attachment member (22) is a mesh storage bag (56) into which a pet's toys, leashes, collars, medicines, and food can be stored, such that the pet owner always has a good idea of where a pet's accessories are located.

FIG. 13 is a side, cut-away view of one version of the cushion. In this version, the cushion, generally referred to by (13), has an outer top cover (62) with an inner top liner (60), which is connected to a bottom cover (58) at a seam (64) where the two covers are connected to one another through stitching, heat sealing, or some other permanent means of attachment. In one version of the invention, the inner top liner (60) is waterproof and/or scent-proof, such that the pet owner merely needs to wash the cover and the liner to clean the cushion. The bottom of the cushion also has a means of attachment (22) by which the cushion can be removably attached to the bottom of the shell. Another version of the invention would not have a top cover liner (60), but would have the cover be made of quick-dry nylon and very porous foam, such that when the pet owner wishes to clean the pet bed, he/she merely needs to lean it up against a nearby wall, blast it with a garden hose for a short time, then let it drip dry. The cover of the cushion can also be made from a fabric or other covering material which reflects the pet's body heat back upon the pet (for cold climates), or can "wick away" the pet's body heat for use in hot climates.

What I claim is:

1. A pet bed, comprising: a shell, comprising shell bottom surrounded by a roughly circular shell wall which is attached at its upper portion to a shell side which extends from the junction of the shell wall with the shell side to the surface upon which the pet bed rests, where, the shell bottom is waterproof and has a textured surface, and, where, the shell has one or more bowl cavities built into one end of the shell into which one or more bowls for a pet's food or water can be removably attached, and where, the one or more shell cavities has at its center a means of removably attaching a bowl, such that the bowl can be easily inserted or removed by the pet's owner at his or her will, and where, the shell cavities are elevated above the ground level, and, where, the shell has one or more sections of holes designed to allow for diffusion in of aromatherapy fragrances, and, one or more cushions of a shape that they rest upon the shell bottom and fit into the cavity created by the shell sides.

2. The pet bed of claim 1, where, the shell is comprised of two parts, an upper section and a lower section, where the upper section is comprised of the shell bottom, the shell walls, and the upper half of the shell sides, and the lower section is comprised of the lower half of the shell sides, and where the upper section and the lower section meet at an attachment line, where both the upper section and the lower section have stabilizing ridges to help retain the structural integrity of the shell, where the upper section and the lower section overlap, where there are two holes, one in the upper section and one in the lower section and the two holes are aligned, a threaded bolt, which can be inserted through both holes, a wing nut, which can be used to tighten down and temporarily solidify the attachment between the upper section and the lower section.

3. The pet bed of claim 1, further comprising: a tie down post, which comprises an eyelet at the end of a bolt which extends from the bottom side of the shell to the top side, where the eyelet lies above the shell such that a pet owner can tie the pet's leash through the eyelet to secure the pet for washing, drying, or grooming, and where the other end of the bolt extends through the shell to a large, flat washer on the bottom side of the shell, where a nut can be tightened against the large, flat washer such that the tie down post cannot be easily ripped through the shell by a powerful pet, and, three or more rubber feet attached to the edge of the shell where the rubber feet can prevent the shell from sliding around on slick surfaces.

4. The pet bed of claim 1, further comprising one or more cushions, where, the cushions are attached to the shell bottom and to each other by hook and loop, snaps, or another similar easily detached means of attachment such that the cushion can be easily removed for cleaning or replacement.

5. The cushion of claim 4, where the cushion comprises: a porous foam, without a cover, which is sturdy enough to withstand repeated washings by both machine washing and hosing off with a garden hose.

6. The cushion of claim 4, where the cushion comprises: a foam interior portion, and a cover, where, the foam interior can be inserted and retained in the cover through use of a zipper or other means of securing the cover over the foam interior, and, where the cover and be removed easily for cleaning or replacement, and, where, the cover is of a sturdy material which can withstand repeated machine washings.

7. The cushion of claim 6, where, the cushion is machine washable or suitable for hosing off with a garden hose with the cover retained over the foam interior, without the necessity of removing the cover for washing.

8. The cushion of claim 4, where the cushion comprises: a foam interior portion, a cover, and a liner, where the foam interior can be inserted and retained in the cover through use of a zipper or other means of securing the cover over the foam interior, and, where the cover and be removed easily for cleaning or replacement, and, where, the cover is of a sturdy material which can withstand repeated machine washings, and, where, the liner is waterproof and is machine washable.

9. The pet bed of claim 1, further comprising: an aromatherapy product, where, the aromatherapy product is composed of 100% natural ingredients with no insecticides, pesticides, or other chemicals, and where the aromatherapy product is located in the one or more sections of holes designed to allow for diffusion in of aromatherapy fragrances.

10. The aromatherapy product of claim 9, where, the aromatherapy product is a sachet of cedar chips which have been doused with one or more natural aromatherapy oils.

11. The aromatherapy product of claim 9, where, the aromatherapy product is an aromatherapy insert, which comprises a porous material, into which one or more natural aromatherapy oils can be applied, a means of inserting the aromatherapy insert and removing it when it is either used up or when the user wants to switch aromas to a new treatment plan or scent, and one or more natural aromatherapy oils.

12. The aromatherapy product of claim 9, where, the aromatherapy product is a blend useful for skin conditioning and relaxation, comprising lavender, Roman chamomile, carrot seed and marjoram.

13. The aromatherapy product of claim 9, where, the aromatherapy product is a blend useful for boosting the immune system, comprising eucalyptus, ravensare, coriander, and thyme thujarol.

14. The pet bed of claim 1, further comprising: a mesh bag and a means of attaching the mesh bag to the shell, where the mesh bag is designed to hold a pet's toys, medicines, leash, food, and other accessories.

15. A pet bed, comprising: a shell, comprising a shell bottom surrounded by a roughly circular shell wall which is attached at its upper portion to a shell side which is deeper than the shell wall and which extends from the junction of the shell wall with the shell side to the surface upon which the pet bed rests, where, the shell bottom is hung from the shell sides above ground level, and, where, the shell has one or more sections of holes designed to allow for diffusion in of aromatherapy fragrances, and, one or more cushions of a shape that they rest upon the shell bottom and fit into the cavity created by the shell sides, and, an aromatherapy product, where, the aromatherapy product is composed of 100% natural ingredients with no insecticides, pesticides, or other chemicals, and where the aromatherapy product is located in the one or more sections of holes designed to allow for diffusion in of aromatherapy fragrances.

16. The pet bed of claim 15, where, the shell is comprised of two parts, an upper section and a lower section, where the upper section is comprised of a shell bottom, two shell walls, and an upper half of the shell side, and the lower section is comprised of a lower half of the shell sides, and where the upper section and the lower section meet at an attachment line, where both the upper section and the lower section have stabilizing ridges to help retain the structural integrity of the shell, where the upper section and the lower section overlap, where there are two holes, one in the upper section and one in the lower section and the two holes are aligned such that a threaded bolt can be inserted through both holes, a threaded bolt, a wing nut which can be used to tighten down against the threaded bolt and temporarily solidify the attachment between the upper section and the lower section.

17. The aromatherapy product of claim 15, where, the aromatherapy product is a sachet of cedar chips which have been doused with one or more natural aromatherapy oils.

18. The aromatherapy product of claim 15, where, the aromatherapy product is an aromatherapy insert, which comprises a porous material, into which one or more natural aromatherapy oils can be applied, a means of inserting the aromatherapy insert and removing it when it is either used up or when the user wants to switch aromas to a new treatment plan or scent, and one or more one or more natural aromatherapy oils.

19. The pet bed of claim 15, further comprising: a tie down post, which comprises an eyelet at the end of a bolt which extends from the bottom side of the shell to the top side, where the eyelet lies above the shell such that a pet owner can tie the pet's leash through the eyelet to secure the pet for washing, drying, or grooming, and where the other end of the bolt extends through the shell to a large, flat washer on the bottom side of the shell, where a nut can be tightened against the large, flat washer such that the tie down post cannot be easily ripped through the shell by a powerful pet.

20. The pet bed of claim 15, further comprising: a mesh bag and a means of attaching the mesh bag to the shell, where the mesh bag is designed to hold a pet's toys, medicines, leash, food, and other accessories.

\* \* \* \* \*